Patented Aug. 16, 1938

2,127,205

UNITED STATES PATENT OFFICE 2,127,205

METHOD OF MANUFACTURING DEXTRINE

John E. Clegg, Hempstead, and Frederick C. Hilliard, Setauket, N. Y., assignors to The Arabol Manufacturing Company, New York, N. Y., a corporation of New York No Drawing. Application May 7, 1936, Serial No. 78,406

5 Claims. (Cl. 127—38)

The invention relates to the manufacture of dextrine from starches—either root starches such as are derived from sago, tapioca, potato, sweet potato, cassava, arrowroot and dascheen, or from cereal starches such as are derived from rice, wheat or maize. The general practice heretofore in the preparation of dextrine has been to roast the starch either directly or after first moistening the same with an acid.

The present invention has for an object a novel method of treatment of starches for conversion of the same wholly into dextrine, and whereby not only is the conversion of the starch accelerated but there is produced a dextrine possessing a superior adhesiveness.

This is attained by the novel manner of treating the starch, more especially with respect to the application thereto of a compound having a basic reaction, rather than an acid reaction, and the control of temperature conditions.

In carrying out the invention, use is made of basically reacting ammonium compounds, especially ammonia—either anhydrous or as an aqueous solution thereof; although other basically reacting ammonium compounds, for example, amines and tetra ammonium bases, may be utilized. The starch to be converted into dextrine is subjected, in powdered or lump form in the usual manner with stirring, to the action of such basically reacting ammonium compound which may be mixed with the starch, preferably, by spraying the same therein and in a dry or moistened state. Thereupon, or simultaneously therewith, the mixture is subjected during continued stirring to the action of heat, as by roasting in vacuo or in a suitable gaseous atmosphere at normal, reduced or increased pressure. This heating is continued until all of the ammonia has been expelled, whereupon the temperature is increased until dextrinization is complete.

We are aware that it has been proposed heretofore to treat starch in the presence of ammonia, but such application thereto was substantially instantaneous only; or, in accordance with a different process, failed to provide for the subsequent treatment of the ammonia-treated starch after elimination of all of the ammonia, and in both instances failed to provide a dextrine of the starch treated.

The conversion of starch is believed to involve the breaking down or rupturing of starch granules in the early stages of heating of the starch, which disintegration involves formation of dextrinizing catalysts. In the present process, the ammonia is believed to disintegrate the granules during the initial stage of heating, attacking the alpha amylose and forming a modified starch and a catalyst, such as a fatty acid in the case of cereal starches, or phosphoric acid in the case of ground or root starches. So long as the ammonia is present disintegrating the granules of the starch, it acts to prevent the particular catalyst produced from converting the starch; and it is only when the ammonia has been entirely volatilized that the catalyzer becomes effective, breaking up the modified starch granules or glucosidic molecular chain-linkings in the starch. Under continued and elevated heating, the molecular structure is rearranged into the smaller molecular weight dextrine.

The finished product when treated with iodine turns to cherry red; and a one per cent solution fails to show any sediment and is transparent. There is no indication of starch remaining after the process has been completed; and the product cannot be considered a soluble or modified starch, as is produced by grinding in a ball mill or by treating in a water suspension or with hot alkali and water by dropping the latter into the former. All such products turn blue when treated with iodine, for the gelatinous structure of the starch has been merely broken down and no complete conversion into dextrine has taken place.

The product, also, is characterized by uniformity and by materially increased tackiness, and it possesses a greater gloss upon drying. It is, therefore, particularly suitable for use as a sealing gum for envelope flaps and postage stamps, being in addition odorless and tasteless and of greater flexibility than the usual gums utilized for this purpose. There is, furthermore, no appreciable amount of reducing sugars (dextrose) formed with the product, the amount present being generally less than one per cent and in no case exceeding two and one-half per cent.

As specific examples of both root and cereal starches converted by the novel method forming the subject matter of the present invention, the following are noted:

There is sprayed over 2000 lbs. of powdered corn starch 20 lbs. of 56% ammonium hydroxide; after which heat is applied up to 100° C. The ammonia developed and the small percentage of moisture which is usually found in starch are withdrawn, for example, by suitable exhausting means. At the end of about two hours, all the moisture and the ammonia will have been driven off, whereupon the temperature of the batch is raised temporarily to 120° C. to insure that the batch is entirely free of ammonia. The withdrawal of gases is then discontinued and the temperature raised quickly to 200° C. and maintained for about four hours, when complete dextrinization has taken place.

It would be expected that a British gum would result from this treatment. (British gums are recognized by their heavy body when dissolved in water.) However, the product obtained is a dextrine which remains fluid when dissolved in water and, unlike British gum, has a very low viscosity. Its tackiness, also, greatly exceeds that of dextrine manufactured by known processes.

Heretofore, in making dextrines from sago starch, it has been customary to wash the starch in water, bleach it with calcium hypochlorite, dry it, acidify it and then roast or dextrinize it. When the novel process is applied to sago starch, it produces a much more tacky dextrine in one operation. Furthermore, absolute uniformity results. With 2000 lbs. of sago starch, which usually has a moisture content of 14%, there is sprayed 20 lbs. of 56% ammonium hydroxide over the starch, and heat applied as in the previously noted example.

Tests indicate the ammonia to have two functions; it disintegrates and modifies the starch and changes the alpha amylose content to beta amylose producing phosphoric acid. However, the acid produced does not catalyze the starch until the ammonia has been driven off at the temperature of about 120° C. When this result is obtained, the starch is bone dry and the temperature high enough so that dextrose is not formed, after which the dextrinization of the sago starch is carried on for about four hours at a temperature of about 180° C.

The present application is a continuation in part of application Serial No. 732,886, filed by us the 28th day of June, 1934.

We claim:

1. The method of manufacturing dextrine from starch, which comprises mixing a starch with a basically reacting ammonium compound and heating to 100° C. until all of the ammonia is eliminated, and then raising the temperature to 180° C.–200° C. and continuing heating the mixture until complete conversion into dextrine is attained.

2. The method of manufacturing dextrine from starch, which comprises mixing a starch with a basically reacting ammonium compound and heating to 100° C. until substantially all of the ammonia is eliminated; increasing the temperature for a short period to 120° C., and then further raising the temperature to 180° C.–200° C. and continuing heating the mixture until complete conversion into dextrine is attained.

3. The method of manufacturing dextrine from corn starch, which comprises mixing 2000 lbs. of the starch with 20 lbs. of 56% ammonium hydroxide and heating the mixture for about 2 hours up to a temperature of 100° C. and then for a short period at a temperature of 120° C., and then quickly elevating the temperature to 200° C. and heating for about 4 hours.

4. The method of manufacturing dextrine from sago starch, which comprises mixing 2000 lbs. of the starch with 20 lbs. of 56% ammonium hydroxide and heating the mixture for about 2 hours up to a temperature of 100° C. and then for a short period at a temperature of 120° C., and then quickly elevating the temperature to 180° C. and heating for about 4 hours.

5. The method of manufacturing dextrine from starch, which comprises mixing a starch with a basically reacting ammonium compound and applying heat thereto sufficient to volatilize the ammonia, and raising the temperature to a degree sufficient to dextrinize the starch.

JOHN E. CLEGG.
FREDERICK C. HILLIARD.